United States Patent
Sasabayashi et al.

(10) Patent No.: US 10,535,468 B2
(45) Date of Patent: Jan. 14, 2020

(54) METHOD FOR MANUFACTURING MULTILAYER CERAMIC CAPACITOR

(71) Applicant: Murata Manufacturing Co., Ltd., Nagaokakyo-shi, Kyoto-fu (JP)

(72) Inventors: Takehisa Sasabayashi, Nagaokakyo (JP); Yasuhiro Nishisaka, Nagaokakyo (JP); Satoshi Matsuno, Nagaokakyo (JP); Yoko Okabe, Nagaokakyo (JP)

(73) Assignee: MURATA MANUFACTURING CO., LTD., Kyoto (JP)

( * ) Notice: Subject to any disclaimer, the term of this patent is extended or adjusted under 35 U.S.C. 154(b) by 299 days.

(21) Appl. No.: 15/784,235

(22) Filed: Oct. 16, 2017

(65) Prior Publication Data

US 2018/0108483 A1   Apr. 19, 2018

(30) Foreign Application Priority Data

Oct. 17, 2016   (JP) .................. 2016-203446

(51) Int. Cl.
| | | |
|---|---|---|
| *H01G 7/00* | (2006.01) | |
| *H01G 4/30* | (2006.01) | |
| *H01G 4/008* | (2006.01) | |
| *H01G 4/12* | (2006.01) | |
| *H01G 4/248* | (2006.01) | |

(52) U.S. Cl.
CPC ............. *H01G 4/30* (2013.01); *H01G 4/008* (2013.01); *H01G 4/1209* (2013.01); *H01G 4/248* (2013.01)

(58) Field of Classification Search
CPC ........ H01G 4/30; H01G 4/248; H01G 4/1209; H01G 4/008; H01G 4/2325; H01G 4/0085; H01G 13/006; Y10T 29/417; Y10T 29/435
USPC ..................... 29/25.03, 25.42, 875
See application file for complete search history.

(56) References Cited

U.S. PATENT DOCUMENTS

| | | | | |
|---|---|---|---|---|
| 7,776,252 B2* | 8/2010 | Mihara | ................. | H01C 7/021 |
| | | | | 156/89.12 |
| 9,530,560 B2* | 12/2016 | Onishi | ................... | H01G 4/005 |
| 9,589,729 B2* | 3/2017 | Wada | ...................... | H01G 4/30 |

FOREIGN PATENT DOCUMENTS

JP   2005-268290 A   9/2005

* cited by examiner

*Primary Examiner* — Donghai D Nguyen
(74) *Attorney, Agent, or Firm* — Keating & Bennett, LLP

(57) ABSTRACT

A method for manufacturing a multilayer ceramic capacitor includes preparing a green multilayer body including a stack of dielectric sheets printed with inner electrodes, coating the green multilayer body with a conductive paste that is connected to the inner electrodes, and firing the conductive paste and the green multilayer body at the same time, wherein a rate of temperature increase from about 800° C. to about 1,100° C. during the firing is about 15° C. per minute or more.

18 Claims, 3 Drawing Sheets

METHOD FOR MANUFACTURING MULTILAYER CERAMIC CAPACITOR

CROSS REFERENCE TO RELATED APPLICATIONS

This application claims the benefit of priority to Japanese Patent Application No. 2016-203446 filed on Oct. 17, 2016. The entire contents of this application are hereby incorporated herein by reference.

BACKGROUND OF THE INVENTION

1. Field of the Invention

The present invention relates to a method for manufacturing a multilayer ceramic capacitor including a multilayer body, in which a plurality of dielectric layers and a plurality of inner electrode layers are stacked, and outer electrodes disposed on the end surfaces of the multilayer body so as to be electrically connected to the inner electrode layers.

2. Description of the Related Art

A multilayer ceramic capacitor includes a multilayer body, in which dielectric layers and inner electrode layers are alternately stacked. Pairs of the inner electrode layers are disposed so as to be alternately exposed at the respective opposing end surfaces of the multilayer body. The multilayer ceramic capacitor is produced by coating both end surfaces of a green multilayer body, in which the dielectric layers and the inner electrode layers are alternately stacked, with a conductive paste containing Ni as a primary component, and performing firing in a $N_2$-$H_2$-$H_2$O atmosphere at a maximum temperature of 1,200° C. The conductive paste forms outer electrodes by being fired (refer to, for example, Japanese Unexamined Patent Application Publication No. 2005-268290).

When the conductive paste containing Ni as a primary component to form the outer electrodes, and the multilayer body including dielectric ceramic layers are fired at the same time, shrinkage of Ni occurs prior to shrinkage of the multilayer body because the sintering temperature of Ni is 800° C. and the sintering temperature of the multilayer body is 1,100° C. Consequently, stress is generated between the multilayer body and the outer electrodes, and electrode peeling of the outer electrode from the multilayer body and electrode-end cracking may occur. The electrode-end cracking refers to a crack that extends from an end edge of an outer electrode extending portion into the multilayer body.

SUMMARY OF THE INVENTION

Accordingly, preferred embodiments of the present invention provide methods for manufacturing multilayer ceramic capacitors wherein there is no cause for concern that electrode peeling and electrode-end cracking may occur.

According to a preferred embodiment of the present invention, a method for manufacturing a multilayer ceramic capacitor including a rectangular or substantially rectangular parallelepiped multilayer body, a first outer electrode disposed so as to cover the first end surface, and a second outer electrode disposed so as to cover the second end surface, the multilayer body including a plurality of dielectric layers and a plurality of inner electrode layers stacked with each other, and including a first principal surface and a second principal surface opposite to each other in the stacking direction, a first side surface and a second side surface opposite to each other in the width direction perpendicular or substantially perpendicular to the stacking direction, and a first end surface and a second end surface opposite to each other in the length direction perpendicular or substantially perpendicular to the stacking direction and the width direction, the first outer electrode and the second outer electrode containing Ni as a primary component, first inner electrode layers connected to the first outer electrode and second inner electrode layers connected to the second outer electrode being stacked in the stacking direction, and each of the first outer electrode and the second outer electrode including a plating layer and an underlying electrode layer, includes the steps of preparing a green multilayer body, in which a plurality of dielectric sheets printed with inner electrodes are stacked, coating the green multilayer body with a conductive paste that is connected to the inner electrodes, and firing the conductive paste and the green multilayer body simultaneously, wherein a rate of temperature increase from about 800° C. to about 1,100° C. during the firing is about 15° C. per minute or more.

According to a preferred embodiment of the present invention, the rate of temperature increase may be about 20° C. per minute or more.

According to a preferred embodiment of the present invention, the first outer electrode may include an outer electrode extending portion that extends from the first end surface to the first principal surface, the second principal surface, the first side surface, and the second side surface, the second outer electrode may include an outer electrode extending portion that extends from the second end surface to the first principal surface, the second principal surface, the first side surface, and the second side surface, and the thickness of each of the outer electrode extending portions may be about 18 µm or less, for example.

According to a preferred embodiment of the present invention, a dimension in the length direction of the multilayer ceramic capacitor may be about 1.05 mm or less, a dimension in the width direction may be about 0.65 mm or less, and a dimension in the stacking direction may be about 0.65 mm or less.

According to a preferred embodiment of the present invention, the plurality of inner electrode layers may contain Ni.

According to a preferred embodiment of the present invention, the plating layer may contain Cu.

According to a method for manufacturing a multilayer ceramic capacitor of a preferred embodiment of the present invention, a rate of temperature increase is increased in a section in which shrinkage of Ni is significant in the firing step and, thus, the shrinkage time of the conductive paste and the shrinkage time of the multilayer body are similar to each other. Consequently, there is no cause for concern that electrode peeling and electrode-end cracking may occur because the stress from the outer electrodes on the multilayer body is reduced.

The above and other elements, features, steps, characteristics and advantages of the present invention will become more apparent from the following detailed description of the preferred embodiments with reference to the attached drawings.

DETAILED DESCRIPTION OF THE PREFERRED EMBODIMENTS

Figure 1:
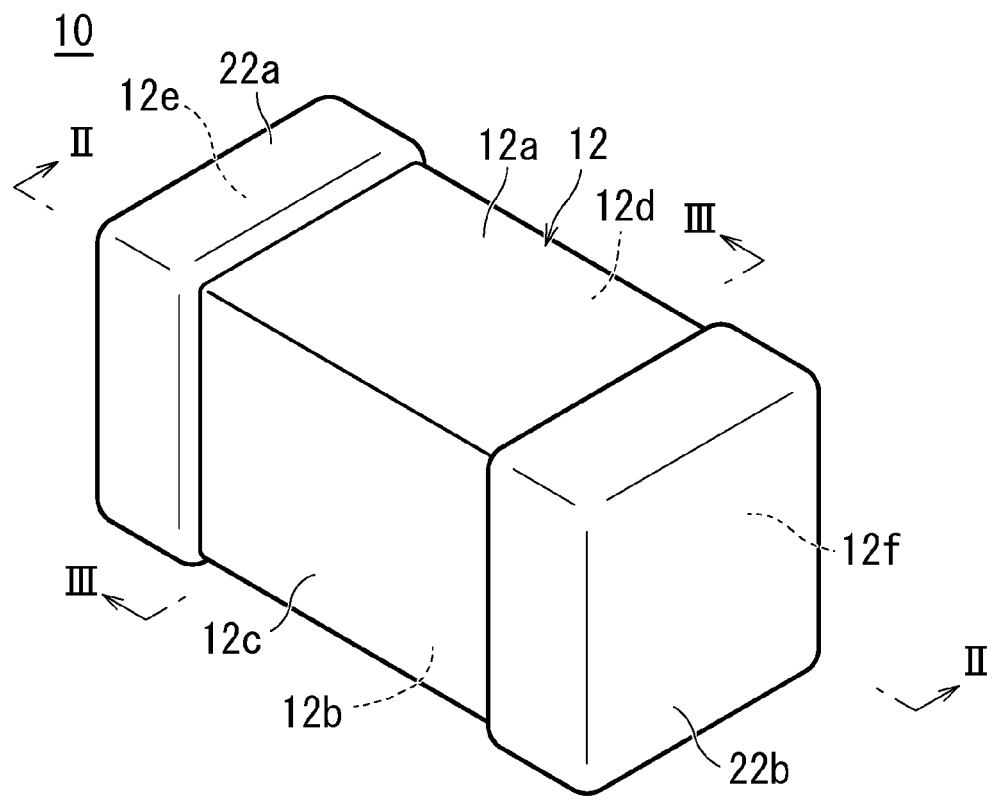
FIG. 1 is a perspective view showing an example of a multilayer ceramic capacitor according to a preferred embodiment of the present invention.
Figure 1:
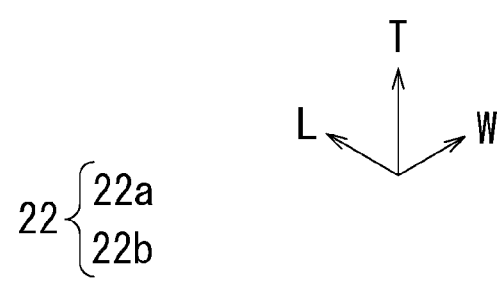
Figure 2:
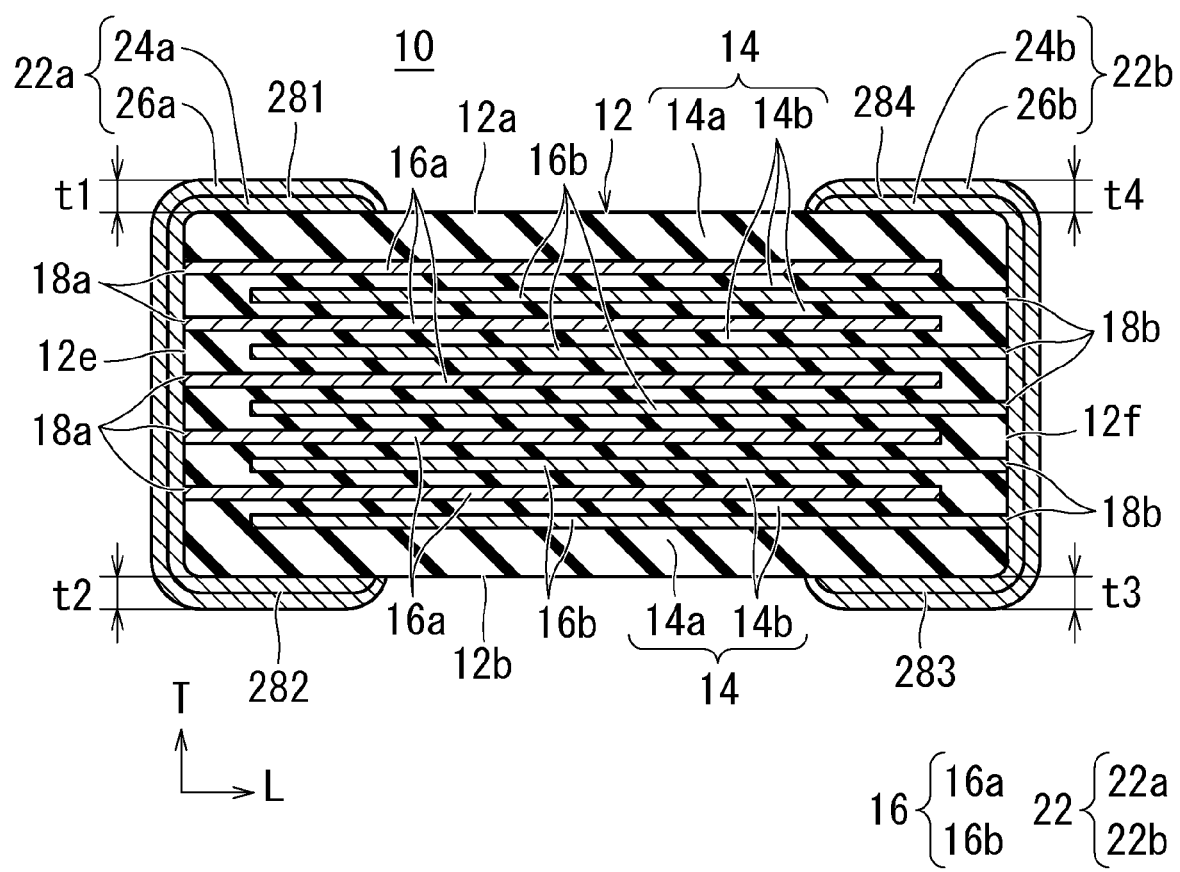
FIG. 2 is a sectional view of the multilayer ceramic capacitor along a line II-II shown in FIG. 1.
Figure 3:
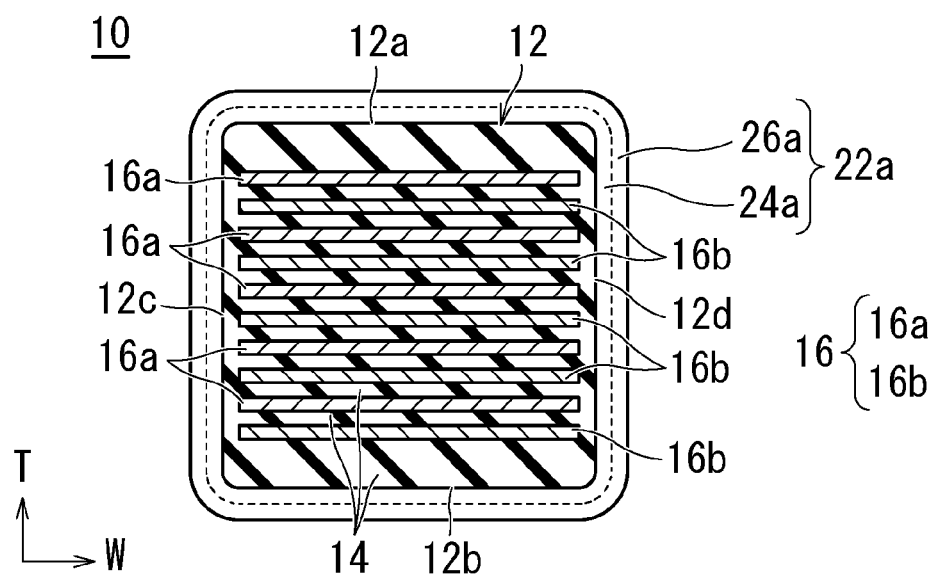
FIG. 3 is a sectional view of the multilayer ceramic capacitor along a line III-III shown in FIG. 1.

As shown in FIG. 1, FIG. 2, and FIG. 3, a multilayer ceramic capacitor 10 includes, for example, a rectangular or substantially rectangular parallelepiped multilayer body 12. The multilayer body 12 includes a plurality of dielectric layers 14 and a plurality of inner electrode layers 16 stacked with each other. In addition, the multilayer body 12 includes a first principal surface 12a and a second principal surface 12b opposite to each other in the stacking direction T, a first side surface 12c and a second side surface 12d opposite to each other in the width direction W perpendicular or substantially perpendicular to the stacking direction T, and a first end surface 12e and a second end surface 12f opposite to each other in the length direction L perpendicular or substantially perpendicular to the stacking direction T and the width direction W. It is preferable that the corner portions and the ridge portions of the multilayer body 12 be rounded. In this regard, the corner portion refers to the portion at which three adjacent surfaces of the multilayer body 12 intersect, and the ridge portion refers to the portion at which two adjacent surfaces of the multilayer body 12 intersect.

Regarding the dielectric material used to forming the dielectric layers 14 of the multilayer body 12, for example, a dielectric ceramic containing a perovskite compound, e.g., $BaTiO_3$, $CaTiO_3$, $SrTiO_3$, $(Ba_{1-x}Ca_x)TiO_3$, or $CaZrO_3$, as a primary component may be used. In addition, a compound, e.g., a Mg compound, a Mn compound, a Si compound, an Al compound, a V compound, or a Ni compound, in a content less than that of the primary component may be added to the above-described primary component. The average dimension in the stacking direction T (average thickness) of the dielectric layers 14 interposed between the inner electrode layers 16 is preferably about 0.5 µm or more and 3.0 µm or less, for example.

As shown in FIG. 2 and FIG. 3, the dielectric layers 14 include outer layer portions 14a and inner layer portions 14b. The outer layer portions 14a are located on the first principal surface 12a side and on the second principal surface 12b side of the multilayer body 12 and are the dielectric layer 14 located between the first principal surface 12a and the inner electrode layer 16 nearest to the first principal surface 12a and the dielectric layer 14 located between the second principal surface 12b and the inner electrode layer 16 nearest to the second principal surface 12b. The regions interposed between the two outer layer portions 14a are the inner layer portions 14b. The dimension (thickness) in the stacking direction T of one of the outer layer portions 14a is preferably about 15 µm or more and about 50 µm or less, for example.

As shown in FIG. 2 and FIG. 3, the multilayer body 12 includes a plurality of rectangular or substantially rectangular first inner electrodes 16a and a plurality of rectangular or substantially rectangular second inner electrodes 16b as a plurality of inner electrode layers 16. The plurality of first inner electrodes 16a and the plurality of second inner electrodes 16b are positioned so as to be alternately and equidistantly arranged in the stacking direction T of the multilayer body 12.

One end of each of the first inner electrodes 16a includes an extending electrode portion 18a that extends to the first end surface 12e of the multilayer body 12. One end of each of the second inner electrodes 16b includes an extending electrode portion 18b that extends to the second end surface 12f of the multilayer body 12. Specifically, the extending electrode portion 18a at one end of each of the first inner electrodes 16a is exposed at the first end surface 12e of the multilayer body 12. The extending electrode portion 18b at one end of each of the second inner electrodes 16b is exposed at the second end surface 12f of the multilayer body 12.

The inner electrode layers 16 contain, for example, a metal, e.g., Ni, Cu, Ag, Pd, an Ag-Pd alloy, or Au. The inner electrode layers 16 may further include dielectric particles having the same composition system as the dielectric ceramic contained in the dielectric layers 14.

For example, the inner electrode layers 16 containing Ni are suitable for the rate of temperature increase of about 15° C. per minute or more compared with the case where Cu is included.

An outer electrode 22 is disposed on each of the first end surface 12e side and the second end surface 12f side of the multilayer body 12 so as to cover the end surface. The outer electrode 22 includes a first outer electrode 22a and a second outer electrode 22b.

The first outer electrode 22a is disposed on the first end surface 12e side of the multilayer body 12. The first outer electrode 22a is arranged so as to cover the first end surface 12e of the multilayer body 12.

The second outer electrode 22b is disposed on the second end surface 12f side of the multilayer body 12. The second outer electrode 22b is arranged so as to cover the second end surface 12f of the multilayer body 12.

The outer electrode 22 includes an outer electrode extending portion that extends from the end surface to the principal surface and the side surface.

The first outer electrode 22a includes an outer electrode extending portion 281 that extends from the first end surface 12e to the first principal surface 12a.

The first outer electrode 22a includes an outer electrode extending portion 282 that extends from the first end surface 12e to the second principal surface 12b.

The second outer electrode 22b includes an outer electrode extending portion 283 that extends from the second end surface 12f to the second principal surface 12b.

The second outer electrode 22b includes an outer electrode extending portion 284 that extends from the second end surface 12f to the first principal surface 12a.

As shown in FIG. 2 and FIG. 3, the first outer electrode 22a includes an underlying electrode layer 24a and a plating layer 26a disposed on the underlying electrode layer 24a in this order from the multilayer body 12 side. Likewise, the second outer electrode 22b includes an underlying electrode layer 24b and a plating layer 26b disposed on the underlying electrode layer 24b in this order from the multilayer body 12 side. The underlying electrode layers 24a and 24b are produced by sintering a conductive paste containing Ni as a primary component.

Each of the underlying electrode layers 24a and 24b includes a ceramic powder as a common material and a conductive metal. From the viewpoint of an improvement of the adhesion to the multilayer body 12, it is preferable that the common material include the same material as the dielectric ceramic included in the dielectric layers 14 of the multilayer body 12.

The amount of the common material added is preferably about 20 percent by weight to about 50 percent by weight relative to 100 percent by weight of the total amount of the conductive metal component and the common material in each of the underlying electrode layers 24a and 24b, for example. The conductive metal component in each of the underlying electrode layers 24a and 24b includes Ni as a primary component. The length of the outer electrode extending portion of each of the underlying electrode layers 24a and 24b that is the distance of extension on the principal surface or the side surface from the end surface of the multilayer body 12 (e-dimension) of each of the underlying electrode layers 24a and 24b is preferably about 50 µm or more and about 400 µm or less, for example.

The plating layer includes at least one selected from, for example, Cu, Ni, Ag, Pd, an Ag-Pd alloy, Au, and Sn. The plating layer may include a plurality of layers. For example, a Cu plating layer has good bondability to the underlying electrode layer containing Ni. For example, a Ni plating layer significantly reduces or prevents erosion of the underlying electrode layer during soldering when the multilayer ceramic capacitor is mounted. For example, a Sn plating layer is used in order to improve the wettability of solder and, thus, facilitate mounting of the multilayer ceramic capacitor.

The dimension in the length direction of the multilayer ceramic capacitor 10 preferably is about 1.05 mm or less, the dimension in the width direction preferably is about 0.65 mm or less, and the dimension in the stacking direction preferably is about 0.65 mm or less, for example. The thickness of the outer electrode extending portion preferably is about 18 µm or less, for example.

A non-limiting example of a method for producing the multilayer ceramic capacitor 10 will be described.

A step of preparing the multilayer body 12 will be described.

Dielectric sheets and a conductive paste for an inner electrode are prepared. The dielectric sheets and the conductive paste for an inner electrode contain a binder and a solvent, and known organic binders and organic solvents may be used.

The conductive paste for an inner electrode is printed in a predetermined pattern on the dielectric sheet by, for example, screen printing or gravure printing and, thus, an inner electrode pattern is formed.

A predetermined number of outer layer dielectric sheets provided with no inner electrode pattern are stacked, dielectric sheets provided with the inner electrode are sequentially stacked thereon, and a predetermined number of outer layer dielectric sheets are stacked thereon so as to produce a multilayer sheet.

The resulting multilayer sheet is pressed in the stacking direction T by isostatic pressing or the like so as to produce a multilayer block.

The multilayer block is cut into a predetermined size and, therefore, a multilayer chip, that is, a green multilayer body 12 is cut. At this time, the corner portions and the ridge portions of the multilayer chip may be rounded by barrel polishing or the like.

In order to form the underlying electrode layers 24a and 24b, a step of coating the multilayer chip (green multilayer body 12) with the conductive paste to be connected to the extension electrode portions 18a and 18b is performed. That is, both end surfaces 12e and 12f of the green multilayer body 12 are coated with the conductive paste. The conductive metal component of the conductive paste includes Ni as a primary component.

The underlying electrode layers 24a and 24b are fired at the same time with the multilayer body 12 at a maximum temperature of about 1,000° C. to about 1,400° C. as a step of firing the conductive paste and the multilayer body 12. That is, the multilayer body 12 is produced by sintering the multilayer chip and, in addition, the underlying electrode layers 24a and 24b are formed by sintering the conductive paste. In the firing step, the rate of temperature increase from about 800° C. to about 1,100° C. is about 15° C. per minute or more, and preferably about 20° C. per minute or more. When the rate of temperature increase from about 800° C. to about 1,100° C. in the firing step is about 15° C. per minute or more, electrode peeling does not occur. When the rate of temperature increase from about 800° C. to about 1,100° C. in the firing step is about 20° C. per minute or more, electrode peeling and electrode-end cracking do not occur.

According to the method for manufacturing a multilayer ceramic capacitor of the present preferred embodiment, the rate of temperature increase is increased in a section in which shrinkage of Ni is significant in the firing step and, thus, the shrinkage time of the conductive paste and the shrinkage time of the multilayer body 12 are similar to each other. Consequently, there is no cause for concern that electrode peeling and electrode-end cracking may occur because the stress from the outer electrodes 22 on the multilayer body 12 is able to be reduced. The electrode peeling refers to peeling of the outer electrode, where the length of peeling is about 5 µm or more, for example. The term electrode-end cracking refers to formation of a crack having a length of about 2 µm or more that extends from an end edge of the outer electrode extending portion into the multilayer body.

Experiments were performed, in which the dimension in each of the directions L, W, and T of the multilayer body 12, the thickness of the outer electrode extending portion, and the rate of temperature increase were changed. The relationship between the rate of temperature increase and the presence or absence of electrode peeling and electrode-end cracking will be described on the basis of the results of the number of the samples in which electrode peeling and electrode-end cracking occurred.

In this regard, the average maximum thickness in the stacking direction T of the outer electrode 22 (average maximum thickness of the outer electrode extending portion) was measured as described below.

A sample was fixed by resin and polished to a depth corresponding to half the multilayer ceramic capacitor in the width direction W so as to obtain the LT cross section. In the LT cross section, as shown in FIG. 2, the maximum thicknesses $t_1$, $t_2$, $t_3$, and $t_4$ of the outer electrode extending portions 281, 282, 283, and 284, respectively, of each of 10 samples were measured using a microscope, and the average value thereof was determined.

That is, the average value of data of 40 positions, which was derived from the number of the samples corresponding to 10×4 measurement positions, was determined.

Meanwhile, electrode peeling and electrode-end cracking of the outer electrode 22 were measured as described below.

A sample was fixed by resin and polished to a depth corresponding to half the multilayer ceramic capacitor in the width direction W so as to obtain the LT cross section. In the LT cross section, electrode peeling (peeling of the outer electrode, where the length of peeling was about 5 µm or more) and electrode-end cracking (formation of a crack having a length of about 2 µm or more that extended from an end edge of the outer electrode extending portion into the multilayer body) of 100 samples were observed. When electrode peeling or electrode-end cracking that fell within the above-described conditions was observed, the sample concerned was rated as defective. The observation results are summarized in Table 1 to Table 3 described below. In this regard, the number of each of electrode peeling and electrode-end cracking in the table is the number of the samples, in which electrode peeling occurred, and the number of the samples, in which electrode-end cracking occurred, in 100 samples of the multilayer ceramic capacitor.

EXPERIMENTAL EXAMPLE 1

A multilayer ceramic capacitor 10 was used. The dimension in the length direction L of the multilayer ceramic capacitor was about 1.05 mm, the dimension in the width direction W was about 0.65 mm, and the dimension in the stacking direction T was about 0.65 mm, the primary component of the dielectric layer 14 was $BaTiO_3$, the inner electrode layer 16 contained Ni, and the outer electrode 22 was a Ni co-sintered electrode produced by applying a conductive paste, which contained Ni as a primary component, in which the common material was $BaTiO_3$, and in which the content of the common material was about 30 percent by weight, to the multilayer body and performing sintering at the same time with the common material.

Evaluation was performed by using a sample in which the average maximum thickness of the outer electrode extending portion after firing was about 15 μm. The e-dimension after firing of the sample used was about 210 μm.

TABLE 1

| Rate of temperature increase from 800° C. to about 1,100° C. (° C./min) | Electrode peeling (number) | Electrode-end cracking (number) |
| --- | --- | --- |
| 5 | 4 | 15 |
| 10 | 2 | 9 |
| 15 | 0 | 3 |
| 20 | 0 | 0 |
| 50 | 0 | 0 |
| 100 | 0 | 0 |
| 300 | 0 | 0 |
| 600 | 0 | 0 |

The firing profile was as described below.

(1) Degreasing treatment was performed in a $N_2$ atmosphere at about 400° C. for about 10 hours.

(2) In a $N_2$-$H_2$-$H_2O$ mixed atmosphere, the $O_2$ partial pressure was maintained at about $10^{-10}$ MPa, the temperature was increased to about 800° C. at about 10° C./min, the temperature was increased from about 800° C. to about 1,100° C. at a rate of temperature increase shown in Table 1, the temperature was increased from about 1,100° C. to about 1,200° C. at about 10° C./min, about 1,200° C. was maintained for approximately 5 minutes and, thereafter, the temperature was lowered.

EXPERIMENTAL EXAMPLE 2

A multilayer ceramic capacitor 10 was used. The dimension in the length direction L of the multilayer ceramic capacitor was about 0.65 mm, the dimension in the width direction W was about 0.35 mm, and the dimension in the stacking direction T was about 0.35 mm, the primary component of the dielectric layer 14 was $BaTiO_3$, the inner electrode layer 16 contained Ni, and the outer electrode 22 was a Ni co-sintered electrode produced by applying a conductive paste, which contained Ni as a primary component, in which the common material was $BaTiO_3$, and in which the content of the common material was about 30 percent by weight, to the multilayer body and performing sintering at the same time with the common material.

Evaluation was performed by using a sample in which the average maximum thickness of the outer electrode extending portion after firing was about 15 μm. The e-dimension after firing of the sample used was about 210 μm.

The firing profile was the same as that in experimental example 1.

TABLE 2

| Rate of temperature increase from 800° C. to about 1,100° C. (° C./min) | Electrode peeling (number) | Electrode-end cracking (number) |
| --- | --- | --- |
| 5 | 3 | 12 |
| 10 | 1 | 6 |
| 15 | 0 | 1 |
| 20 | 0 | 0 |
| 50 | 0 | 0 |
| 100 | 0 | 0 |
| 300 | 0 | 0 |
| 600 | 0 | 0 |

EXPERIMENTAL EXAMPLE 3

A multilayer ceramic capacitor 10 was used. The dimension in the length direction L of the multilayer ceramic capacitor was about 1.05 mm, the dimension in the width direction W was about 0.65 mm, and the dimension in the stacking direction T was about 0.65 mm, the primary component of the dielectric layer 14 was $BaTiO_3$, the inner electrode layer 16 contained Ni, and the outer electrode 22 was a Ni co-sintered electrode produced by applying a conductive paste, which contained Ni as a primary component, in which the common material was $BaTiO_3$, and in which the content of the common material was about 30 percent by weight, to the multilayer body and performing sintering at the same time with the common material.

Evaluation was performed by using a sample in which the average maximum thickness of the outer electrode extending portion after firing was about 18 μm. The e-dimension after firing of the sample used was about 210 μm.

The firing profile was the same as that in experimental example 1.

TABLE 3

| Rate of temperature increase from 800° C. to about 1,100° C. (° C./min) | Electrode peeling (number) | Electrode-end cracking (number) |
| --- | --- | --- |
| 5 | 5 | 21 |
| 10 | 3 | 9 |
| 15 | 0 | 4 |
| 20 | 0 | 0 |
| 50 | 0 | 0 |
| 100 | 0 | 0 |
| 300 | 0 | 0 |
| 600 | 0 | 0 |

The above-described results of experimental example 1 to experimental example 3 can be evaluated as described below.

Regarding every experiment, when the rate of temperature increase from about 800° C. to about 1,100° C. was set to be about 15° C. per minute or more, electrode peeling occurred in none of 100 multilayer ceramic capacitors.

Regarding every experiment, when the rate of temperature increase from about 800° C. to about 1,100° C. was set to be about 20° C. per minute or more, electrode peeling and electrode-end cracking occurred in none of 100 multilayer ceramic capacitors.

Regarding every experiment, the maximum thickness of the outer electrode extending portion was about 18 µm or less.

Regarding every experiment, the dimension in the length direction L of the multilayer ceramic capacitor was about 1.05 mm or less, the dimension in the width direction W was about 0.65 mm or less, and the dimension in the stacking direction T was about 0.65 mm or less.

Regarding every experiment, the inner electrode layer contained Ni.

On the other hand, when the rate of temperature increase from about 800° C. to about 1,100° C. was set to be about 10° C. per minute or less, electrode peeling and electrode-end cracking occurred in a plurality of samples in 100 multilayer ceramic capacitors.

The preferred embodiments according to the present invention are disclosed in the above description, but the present invention is not limited to these.

The mechanism, the shape, the material, the amount, the location, the arrangement, or the like of the above-described preferred embodiments can be variously modified within the bounds of not departing from the technical idea and purpose of the present invention, and the modifications are included in the present invention.

For example, the first outer electrode 22a may be provided on only the first end surface 12e without extending to the principal surface or the side surface, and the second outer electrode 22b may be provided on only the second end surface 12f without extending to the principal surface or the side surface.

While preferred embodiments of the present invention have been described above, it is to be understood that variations and modifications will be apparent to those skilled in the art without departing from the scope and spirit of the present invention. The scope of the present invention, therefore, is to be determined solely by the following claims.

What is claimed is:

1. A method for manufacturing a multilayer ceramic capacitor including a multilayer body, a first outer electrode covering a first end surface of the multilayer body, and a second outer electrode covering a second end surface of the multilayer layer, the multilayer body including a plurality of dielectric layers and a plurality of inner electrode layers stacked with each other in a stacking direction, and a first principal surface and a second principal surface opposite to each other in the stacking direction, a first side surface and a second side surface opposite to each other in a width direction perpendicular or substantially perpendicular to the stacking direction, and the first end surface and the second end surface opposite to each other in a length direction perpendicular or substantially perpendicular to the stacking direction and the width direction, the first outer electrode and the second outer electrode including Ni as a primary component, first inner electrode layers connected to the first outer electrode and second inner electrode layers connected to the second outer electrode being stacked in the stacking direction, and each of the first outer electrode and the second outer electrode including a plating layer and an underlying electrode layer, the method comprising:
preparing a green multilayer body, in which a plurality of dielectric sheets printed with inner electrodes are stacked;
coating the green multilayer body with a conductive paste that is connected to the inner electrodes; and
firing the conductive paste and the green multilayer body simultaneously; wherein
a rate of temperature increase from about 800° C. to about 1,100° C. during the firing is about 15° C. per minute or more.

2. The method for manufacturing a multilayer ceramic capacitor according to claim 1, wherein the rate of temperature increase is about 20° C. per minute or more.

3. The method for manufacturing a multilayer ceramic capacitor according to claim 1, wherein
the first outer electrode includes a first outer electrode extending portion that extends from the first end surface to the first principal surface, the second principal surface, the first side surface, and the second side surface;
the second outer electrode includes a second outer electrode extending portion that extends from the second end surface to the first principal surface, the second principal surface, the first side surface, and the second side surface; and
a thickness of each of the first and second outer electrode extending portions is 18 µm or less.

4. The method for manufacturing a multilayer ceramic capacitor according to claim 1, wherein
a dimension in the length direction of the multilayer ceramic capacitor is about 1.05 mm or less;
a dimension in the width direction is about 0.65 mm or less; and
a dimension in the stacking direction is about 0.65 mm or less.

5. The method for manufacturing a multilayer ceramic capacitor according to claim 1, wherein the plurality of inner electrode layers include Ni.

6. The method for manufacturing a multilayer ceramic capacitor according to claim 1, wherein the plating layer includes Cu.

7. The method for manufacturing a multilayer ceramic capacitor according to claim 1, wherein the multilayer body is rectangular or substantially rectangular parallelepiped in shape.

8. The method for manufacturing a multilayer ceramic capacitor according to claim 1, wherein the dielectric sheets are formed of a dielectric ceramic including a perovskite compound.

9. The method for manufacturing a multilayer ceramic capacitor according to claim 8, wherein the dielectric sheets include one of Mg, Mn, Si, Al, V, and Ni.

10. The method for manufacturing a multilayer ceramic capacitor according to claim 1, wherein a thickness of each of the plurality of dielectric layers is about 0.5 µm or more and 3.0 µm or less.

11. The method for manufacturing a multilayer ceramic capacitor according to claim 1, wherein the plurality of inner electrode layers include one of Ni, Cu, Ag, Pd, an Ag-Pd alloy, and Au.

12. The method for manufacturing a multilayer ceramic capacitor according to claim 1, wherein the underlying electrode layer is formed by sintering a conductive paste including Ni as a primary component.

13. The method for manufacturing a multilayer ceramic capacitor according to claim 1, wherein the plating layer includes one of Cu, Ni, Ag, Pd, an Ag-Pd alloy, and Sn.

14. The method for manufacturing a multilayer ceramic capacitor according to claim 1, wherein the plating layer includes a plurality of layers.

15. The method for manufacturing a multilayer ceramic capacitor according to claim 1, further comprising pressing the plurality of dielectric sheets before the coating the green multilayer body.

16. The method for manufacturing a multilayer ceramic capacitor according to claim 1, wherein in the coating the green multilayer body includes coating end surfaces of the green multilayer body.

17. The method for manufacturing a multilayer ceramic capacitor according to claim 1, wherein the firing the conductive paste and the green multilayer body simultaneously is performed at a maximum temperature of about 1,000° C. to about 1,400° C.

18. The method for manufacturing a multilayer ceramic capacitor according to claim 1, wherein the first outer electrode is provided on only the first end surface without extending to the first principal surface or the first side surface, and the second outer electrode is provided on only the second end surface without extending to the second principal surface or the second side surface.

* * * * *